Patented Nov. 8, 1938

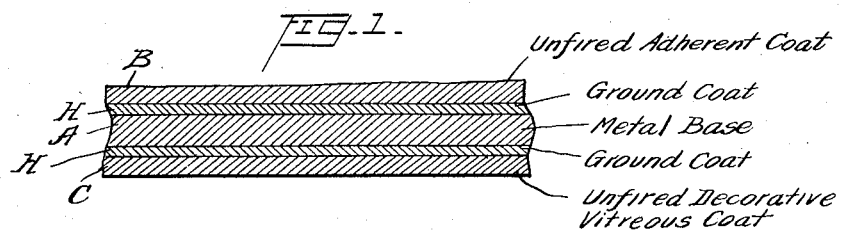
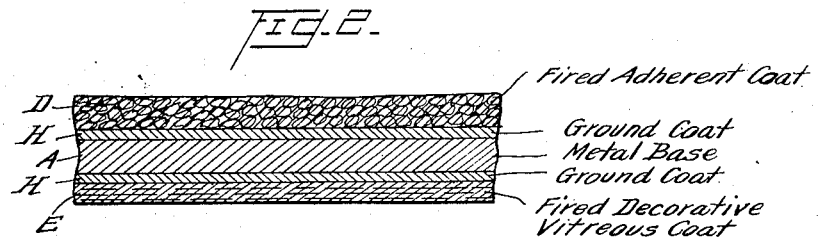
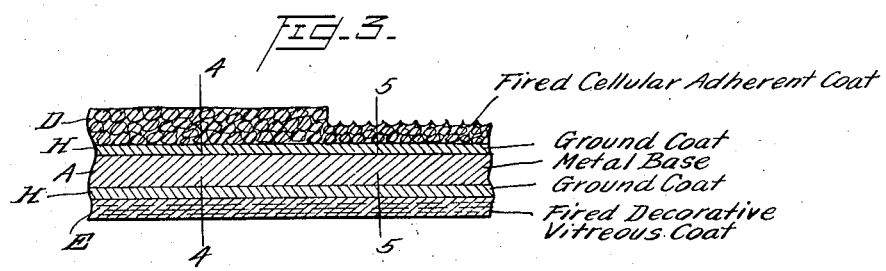
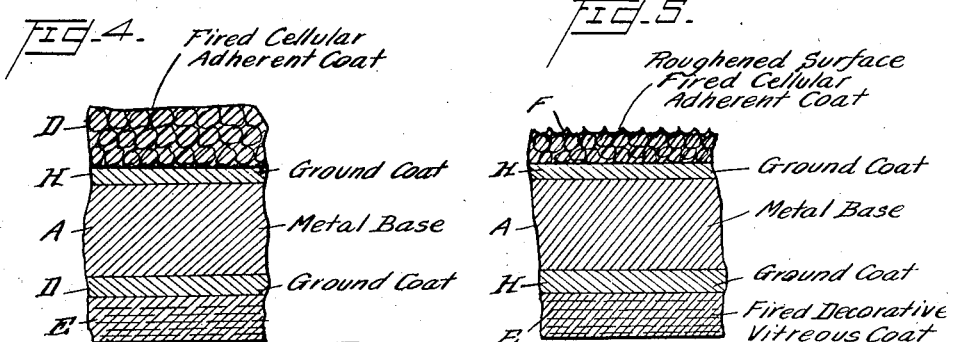
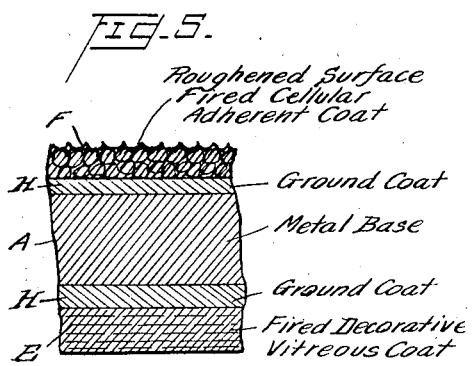
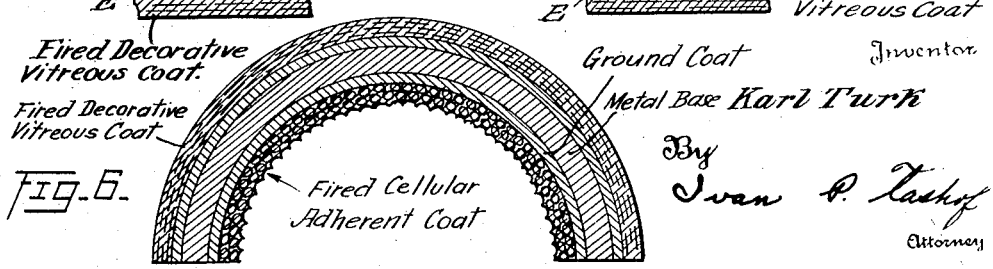

2,135,544

UNITED STATES PATENT OFFICE 2,135,544

FACED BUILDING ELEMENT

Karl Turk, Riderwood, Md., assignor to The Porcelain Enamel and Manufacturing Company of Baltimore, Baltimore, Md., a corporation of Maryland Application August 31, 1936, Serial No. 98,776

8 Claims. (Cl. 91—73)

The present invention relates to the production of a composite article comprising a metal base having permanently united therewith a relatively thin cellular porcelain enamel coating having a roughened surface adapted to cause the composite article to readily adhere and become united to any surface to which it is applied. The thin layer of cellular porcelain enamel comprises the fusion product of porcelain enamel material in the presence of a gas evolving agent, as hereinafter set forth.

It is desired to point out that said fusion product is of sufficient thickness to function only as an adherence medium to cause the plate to adhere to the surface to which it is applied, all as hereinafter pointed out.

It is exceedingly difficult to cause metal sheets, such as sheet iron, or steel, or cast iron, to adhere to a given medium, as for example a wall having a plaster or cement finish. It has previously been proposed to weld to the back of the metal sheet pins or lugs but this has not proven satisfactory. Further, considerable difficulty has been experienced in the maintaining of metal sheets in position affixed to cement or plaster on external building walls, due to break-down of the bond between the plate and the plaster through the forces of expansion and contraction, due to temperature variations.

It is the primary object of the present invention to provide a metal sheet which is incapable of adhering to many kinds of material, with a relatively thin cellular porcelain enamel coating provided with non-connected cellular cavities having side walls of relatively great rigidity capable of withstanding wide temperature variations, said surface providing means for causing the article to adhere to the surface to which it is applied.

It is an additional object of the present invention to provide a surface of the character above set forth in which the top surfaces of the side walls lie in slightly different planes, just sufficient to provide a file-like surface.

It is a further object of the present invention to provide articles of the character above set forth, one surface of which carries a decorative vitreous porcelain enamel coating.

The roughened surface may be provided in a variety of ways, but it is preferred that said surface be produced by removing the upper portion of the cellular backing, and thereby provide a multiplicity of cup-like depressions greatly increasing the adhesive capacity of the cellular surface. It is desired to point out that at least two factors are involved in increasing the adherence of the surface, the first being the increase of the surface area, and the second being the utilization of cup-like depressions which are used to key the composite article when the same is forced against a cement or plaster surface, or the like.

One field wherein the basic principles of the present invention may apply is the architectural and building field. In the building field, there is a well defined trend to finish the exterior and interior of building walls with metal sheets carrying a vitreous coating of porcelain enamel. These metal sheets are required to adhere to a building wall generally composed of ceramic fire-proofing brick or cement compositions. The present invention provides means for causing the adherence of these sheets which may carry on one surface a decorative vitreous coating of porcelain enamel. Due to the fact that the porcelain sheets preferably are enamelled on both sides to prevent warpage and distortion in processing, the enamel or ground coat makes it difficult to cause the sheets to adhere to the walls unless some means are provided for increasing the adherence capacity of the sheets. The invention will be set forth by reference to the accompanying drawings, wherein:

Figure 1 is a transverse section of the article before firing showing somewhat diagrammatically a metal base having on one of its surfaces a decorative vitreous coating, and on its reverse surface a ground coat, and thereover a coating of enamel adapted to form the adherent backing of the present invention.

Figure 2 shows the article after firing.

Figure 3 is a transverse section showing somewhat diagrammatically the fired article provided with the adherent coating from which the top surface or layer has been removed to provide a surface of greatly increased adhesive, adhering or gripping power.

Figure 4 is an enlarged cross section taken on line 4—4 of Figure 3.

Figure 5 is an enlarged cross section taken on line 5—5 of Figure 3.

Figure 6 is a transverse section showing somewhat diagrammatically the present invention applied to a semi-cylindrical metal plate having on its exterior surface a decorative vitreous coating and on its interior surface a ground coat, and thereover the adherent coating from which the top surface or layer has been removed to provide a surface of greatly increased adhesive, adhering or gripping power.

Figure 7:
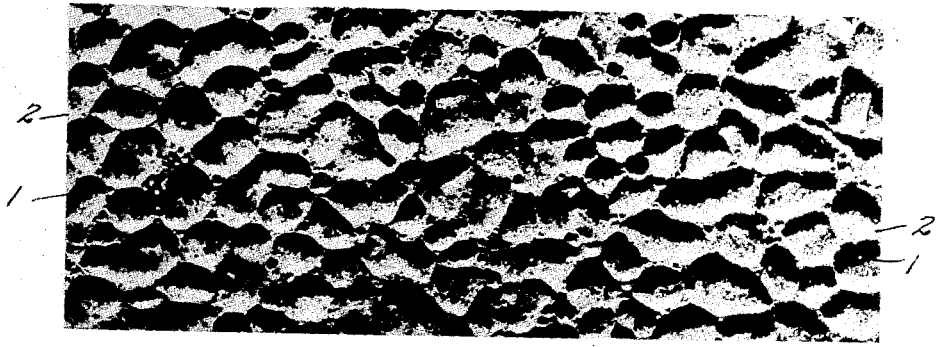

Figure 7 is the reproduction of a photomicrograph showing the cellular coating magnified to ten times, wherein said cellular coating has been fired for two minutes at 1500° Fahrenheit.

Figure 8:
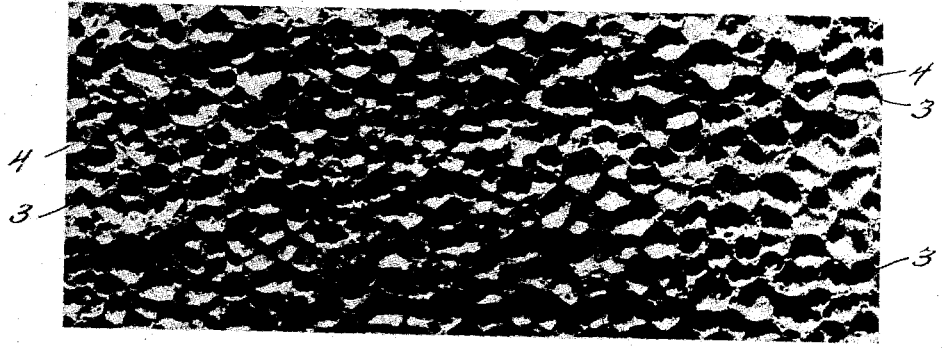

Figure 8 is the reproduction of a photomicrograph showing the cellular coating magnified to ten times, wherein said cellular coating has been fired for two and one-half minutes at 1450° Fahrenheit.

Figure 9:
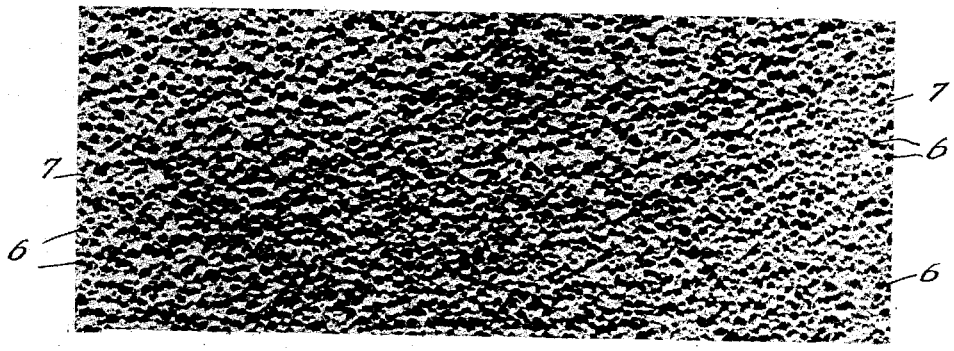

Figure 9 is the reproduction of a photomicrograph showing the cellular coating magnified to ten times, wherein said cellular coating has been fired for four minutes at 1350° Fahrenheit.

It may be noted that Figures 1 to 6 inclusive are not intended to be exact reproductions of an article according to this invention, but are more or less diagrammatic.

The process by which the article of the present invention is made comprises applying to a base porcelain enamel material having incorporated therein a gas producing agent, firing the so-treated article under such conditions as to fuse or vitrify or semi-fuse or semi-vitrify said material, and trap the gases evolving from the gas-producing agent, and then cooling the article. The porcelain enamel material forms on the base, or where a ground coat is used, on the ground coat, a relatively thin cellular layer of porcelain enamel from which a top layer or layers may be removed, preferably by grinding or other equivalent means, to give rise to a multiplicity of cup-like depressions functioning to greatly increase the adhering and gripping qualities of the article. The preferred porcelain enamel material is porcelain enamel frit, although other porcelain enamel materials may be used.

Broadly stated, the metal sheet may have on one side a fused porcelain enamel coating or any other vitreous enamel coating, and there may be directly applied to the reverse side a porcelain enamel mixture which has incorporated therein a gas-producing agent, and the article may then be fired. Instead of applying the enamel material directly to the reverse side, a ground coat may be first applied and then the enamel mixture having a gas-producing agent therein. The enamel on heating begins to fuse, and the gas evolves slowly, causing the enamel to rise in a multitude of small bubbles much after the same fashion in which ordinary dough rises after baking powder or yeast has been added. This gives a final product of cellular structure in which the volume has been greatly increased and the specific gravity has been greatly decreased. The bubbles range from microscopic size upward, depending on the material added to the enamel and the subsequent treatment of the latter.

It is desired to point out that it is well known in porcelain enamels to introduce materials such as, for example, fluorides or organic materials capable of being absorbed by clay to promote the formation of sub-microscopic bubbles in the porcelain enamel for the purpose of increasing opacity. These bubbles are not of sufficient size to produce, when the surface of the enamel is removed, cup-like depressions of sufficient depth to increase the adherence of the enamelled article to the surface to which it is applied. The bubbles of the present invention are of sufficient size so that when a surface is removed, cup-like depressions of sufficient depth are produced to greatly increase the adherence of the composite article to the surface to which it is applied.

It is desired to point out that the porcelain enamel which may be used to form the cellular backing is low in cost, and can be easily applied to the base member. No special enamel is necessary. In fact, it is possible to use what is ordinarily considered scrap enamel, that is thrown away in the enameling plant because of contamination with dirt or an admixture of enamels that would not combine oridnarily with one another. While this is the most economical source of the enamel material, the consumption of enamel for this purpose will, undoubtedly, exceed the amount of rejected enamel material on hand at any one time, and, therefore, probably it will be necessary to mill up enamel for this specific purpose.

The following is an illustrative example of the present invention: Referring to Figure 1, a sheet or article of any other shape is first cleaned by pickling, sandblasting or other appropriate means, to remove scale and dirt. Thereafter, a coating or ordinary ground coat of porcelain enamel H, such as is used every day in the enameling industry, is applied and fired on the sheet. This coating may be applied to one or both faces of the sheet, depending upon the character of the sheet. If steel sheets are used, it is customary to apply the ground coat to both faces of the sheet, to prevent warpage of the sheet. As well known to those skilled in the art, the ground coat may be applied at the rate of 36 grams per two square feet. Over the ground coat, on one side of the sheet, there is applied a fired decorative coat C, which may be colored or plain. The reverse face of the sheet carrying the ground coat H has applied thereto, by spraying or otherwise, a cellular coating B, prepared as hereinafter set forth. The cellular coating B is applied at a rate of 40 to 50 grams per square foot.

In most cases, it will be sufficient to spray a single coating of the cellular coating material B. The coating, after being dried, is fired, the firing treatment being similar to that usual to porcelain enamel. It may be stated in general the higher the temperature of fusing the larger the bubble size.

In preparing cellular material of the present invention, the choice of enamel frits will be to a large extent governed by the gas-producing media used, since the evolution of gases will be resultant either from the disintegration of said medium due to thermal action or to the reaction of the medium with the enamel during fusion. The latter is the preferred type, since it is more readily controlled. The above reactions are of a thermo-chemical nature so that choice of proper enamel frits for the present invention will be dependent not only upon the chemical composition of the frit but upon the fusion temperature thereof. For example, Formula No. 1, given below, is representative of a type of frit which becomes fused or viscous, at a temperature of approximately 1500° F., while Formula No. 2 is representative of a type of frit which fuses or becomes viscous at a temperature of approximately 1200° F. When cobaltous-cobaltic oxide ($Co_3O_4$) is fused into an enamel, it is taken into solution as cobaltous oxide (CoO) with the liberation of one molecule of oxygen, the latter in the form of a gas which is entrapped in the viscous enamel, causing it to swell. When the enamel frit of Formula No. 1 is used at a temperature of 1500° F., the reaction takes place and swelling results. If, on the other hand, the enamel frit of Formula No. 2 is used mixed with cobaltous-cobaltic oxide, and heated to the fusion point of the enamel at 1200° F., the temperature is not sufficient to induce the reaction and no swelling results. Further, if calcium carbonate (CaCO3) or dolomite (Ca—MgCO3) be used with an enamel frit of the composition shown in Formula No. 1, no chemical reaction will take place, even though the mixture be heated to 1500° F. On the other hand, when enamel frit of the composition shown in Formula No. 2 is used with these gas-producing agents, an excellent cellular adherence material may be obtained by heating to 1200° F. Other gas-forming materials, as for examples, barium carbonate (BaCO3) will give equally good results with either type of enamel frit.

FORMULA No. 1

*Typical enamel frit fusing at approximately 1500° F.*

| | Parts by weight |
|---|---|
| Borax | 26.0 |
| Sodium nitrate | 6.2 |
| Fluorspar | 5.8 |
| Cryolite | 12.5 |
| Flint | 15.3 |
| Feldspar | 27.1 |
| Zinc oxide | 1.4 |
| Potassium carbonate | 1.0 |
| Sodium antimonate | 4.1 |

FORMULA No. 2

*Typical enamel frit fusing at approximately 1200° F.*

| | Parts by weight |
|---|---|
| Feldspar | 29.5 |
| Sodium nitrate | 4.1 |
| Sodium carbonate | 1.6 |
| Borax | 25.4 |
| Litharge | 24.6 |
| Zinc oxide | 5.7 |
| Cryolite | 1.2 |
| Fluorspar | 5.7 |
| Antimony oxide | 2.2 |

It will be readily understood that the above compositions are merely typical examples of enamel frit compositions, and the present invention is in no way limited to their use, but may include any porcelain enamel frit which will react with a gas-forming medium to form the cellular material of the present invention.

The adherence-promoting enamel may be compounded as follows:

FORMULA No. 3

| | Pounds |
|---|---|
| Vitreous enamel frit (see Formula No. 1 for preparation of frit) | 100 |
| Cobalt oxide (cobaltic—cobaltous oxide—Co3O4) | 5 |
| Nickelous oxide | 10 |
| Water | 35 |

The above mixture prior to application to the metal sheet is charged into a pebble mill and ground to a fineness of one gram residue on a 325 mesh screen from a 500 gram sample, wet weight. In the case of the application of the enamel by slushing, it may be sometime necessary to grind to a lesser fineness in order to prevent cracking in drying. This fineness may be readily controlled by those skilled in the art. If the material tends to settle, a small amount of magnesium sulphate or equivalent material is added to keep the material in suspension in the aqueous dispersion medium.

During the firing, the cobalt oxide reacts with the enamel frit as set forth above, releasing some of its oxygen. The cobalt oxide being well distributed in the porcelain enamel mixture, the oxygen evolved therefrom on heating is more or less evenly dispersed through the enamel mass, in the form of bubbles. Since the size of the cup-like depressions depends upon the bubble structure, it has been found that the degree of adherence is influenced by the size of these cup-like depressions. Thus, the smaller the size, within limit, the greater the surface area and the greater the adhesion will be.

Other vitreous enamel mixtures may be used with equal success, with slight changes in the firing cycle. Such changes will be obvious to anyone skilled in the art of porcelain enameling.

It will be readily understood by those skilled in the art that the above Formula No. 3 and the subsequent formulae given below, relate to the preparation of the cellular material in aqueous suspension or so-called "slip" form.

The following examples set forth wet milled mixtures, which have given satisfactory results:

FORMULA No. 4

| | Preferred | Limits |
|---|---|---|
| | *Pounds* | *Pounds* |
| Vitreous enamel frit (No. 2) | 100 | |
| Powdered dolomite (a natural calcium-magnesium carbonate) | 7½ | 5 to 15 |
| Vallendar clay | 8 | |
| Water | 40 | |

FORMULA No. 5

| | *Pounds* | *Pounds* |
|---|---|---|
| Vitreous enamel frit (No. 2) | 100 | |
| Calcium carbonate (CaCO3) | 5 | 2½ to 10 |
| Water | 30 | |

FORMULA No. 6

| | *Pounds* | *Pounds* |
|---|---|---|
| Vitreous enamel frit No. 1 | 100 | |
| Barium carbonate | 10 | 7½ to 15 |
| Bentonite | ¼ | |
| Water | 35 | |

FORMULA No. 7

| | *Pounds* | *Pounds* |
|---|---|---|
| Vitreous enamel frit No. 2 | 100 | |
| Barium carbonate | 5 | 2½ to 10 |
| Bentonite | ¼ | |
| Water | 35 | |

FORMULA No. 8

| | *Pounds* | *Pounds* |
|---|---|---|
| Vitreous enamel frit No. 1 | 100 | |
| Cobaltous-cobaltic oxide | 5 | 2½ to 7½ |
| Water | 35 | |

Admixtures of the above formulae have also been found in some cases to lead to advantageous results, as the following:

FORMULA No. 9

| | *Pounds* | *Pounds* |
|---|---|---|
| Vitreous enamel frit No. 1 | 100 | |
| Cobaltous-cobaltic oxide | 2½ | 2½ to 5 |
| Barium carbonate | 7½ | 5 to 10 |
| Bentonite | ¼ | |
| Water | 35 | |

The above examples are merely illustrative of suitable mixes for preparing the cellular adherence backing, and many variations thereof will occur to those skilled in the art. In general, it may be stated that about one per cent (1%) to twenty per cent (20%) of the gas-evolving agent may be incorporated in the vitreous enamel mix and produce satisfactory commercial results. However, the amount of the gas-evolving agent added to the vitreous enamel material will depend on a number of factors including the character of each of these two ingredients, the time of firing and the temperature of firing. Therefore, it is not desired to be limited, in all cases, to this range of the gas-evolving agent.

The combination of materials and frits may be changed, the sequence of steps set forth need not be followed and the temperature at which the enamel is fired may be changed, since with some gas producing agents, the bubbling or evolution of gas begins at quite a low temperature. The gas producing agent may be any of a number of insoluble organic or inorganic products, such as the various oxides, carbonates, sulphides and other compounds which, at higher temperatures, release the water of crystallization or dissociate at a controllable rate.

As shown in Figures 3 and 5, the top surface or layer of the adherence increasing layer, after firing, is removed by an appropriate means, as by grinding off the top layer, to thereby expose the immediately adjacent surface F, the gripping area of which is greatly increased. It is possible to remove the surface layer of the multi-cellular structure by an appropriate means.

While the usual base material is sheet or cast iron, other metals such as stainless steel, copper, nickel, chromium or other plated steels and metals may be utilized as the base member. Such a metal base may or may not carry a vitreous coating on the face opposite to that carrying the cellular insulating coating. For example, the metal face may be chromium plated and the opposite base carry the cellular insulating backing. However, for the exterior of building walls, it is preferred that the exterior face carry a vitreous coating, which may have a decorative effect, such effects being well known in the porcelain enamel art. The articles herein disclosed may also be used for the interior walls of buildings, and may be applied directly to the usual brown coat of plaster finish. The exposed face of the metal base may have a vitreous enamel coating, or may be chromium plated or otherwise, provided with a suitable finish.

It will be readily understood by those skilled in the art of porcelain enameling that the increased volume and decreased specific gravity of the cellular material as compared with the unfused vitreous enamel material will be dependent upon the basic porcelain enamel used, upon the type and amount of gas-forming medium and upon the method of application. Thus, for example, when the application is made by spraying, the increase in volume will be between six and eight times while the specific gravity will be less than one-eighth of the original.

In some cases, it becomes possible to increase the volume to eight times, and similarly decrease the specific gravity to one-eighth of the specific gravity of the unburned material. Since even greater increase in volume is possible by the proper combination of vitreous enamel material and gas-forming material, it will be obvious to one skilled in the art to decrease the specific gravity and increase the volume to any desired amount. Therefore, it is not desired to limit the invention to the specific limit of extension set forth or the specific decrease in the specific gravity set forth, but to claim any extension of volume and decrease in the specific gravity which may be obtained by following the present invention.

It is desired to point out that the preferred gas-forming mediums are cobalt oxide, or a mixture of cobalt and nickelous oxide, or barium carbonate, or a mixture of cobalt oxide and barium carbonate, or a mixture of cobalt oxide, nickelous oxide as set forth, and barium carbonate.

When the cobalt oxide is used alone as a gas-evolving agent in a mixture with porcelain enamel material, the preferred percentages are between 2½% to 7%, and when the barium carbonate is used alone, the preferred percentages are between 10% and 15%.

When a mixture of nickelous oxide and cobalt oxide, as set forth, is used as the gas-evolving agent, the preferred percentages are 5% of nickelous oxide and between 2½% and 7% of cobalt oxide.

If cobalt oxide is used in a mixture with barium carbonate as the gas-evolving agent, the preferred percentages are from 2½% to 5½% of cobalt oxide, and from 5% to 10% of barium carbonate.

If a mixture of nickelous oxide, barium carbonate and cobalt oxide is used as gas-evolving agent, the percentages are 5% nickelous oxide, 2½% to 5% cobalt oxide, and 5% to 10% barium carbonate. All of the percentages are taken on the weight of the vitreous enamel frit used in the mix.

Calcium carbonate is an example of an alkaline earth carbonate. While it is preferred to use carbonates of this class, it is desired to point out that other metal carbonates may be used. Instead of using the carbonates as the gas-evolving agent, in some cases, the alkaline earth sulphates may be used, such as barium, calcium, strontium sulphate. Other metal sulphates may also be used.

While it is preferred to use from ½% to 15% of the gas-evolving agent, in some cases, the limit may be from ½% to 20%.

In the form of the invention, as shown in Figure 6, there is provided a curved metal plate J, preferably in the form of a semi-cylinder, the outer surface of which carries a fired decorative coating of porcelain enamel K, the usual ground coat L being also provided. The interior surface of the plate carries a ground coat M and a cellular coating N, provided with cells O. Units of this particular shape may be used to encase columns as for example concrete coated iron columns or concrete columns.

Figure 7 is a reproduction of a photomicrograph, showing the cellular coating magnified to ten (10) times.

The cellular coating set forth in Figure 7 was produced by spraying onto the ground coat enamel an adherence-promoting enamel compounded in accordance with the herein disclosed Formula No. 3, said enamel containing cobaltic cobaltous oxide ($Co_3O_4$) and nickelous oxide. The enamel was sprayed on to a twenty (20) gauge steel sheet which had already been provided with a fired ground coating having a thickness of approximately 1.25 mm. The material which produces the cellular coating on firing was applied to the fired ground coating at a rate of 48 grams per square foot. The cellular coating was fired for 2 minutes at 1500° Fahrenheit. After firing, the material was cooled. It is one of the characteristics of the present invention that after the cellular material is cooled there is formed at the topmost portion of the cellular material a layer of cellular material which has no appreciable strength or rigidity. It is necessary, in practicing the present invention, both from a standpoint of the method involved and the final article produced, to remove this upper layer of weak cellular material so as to expose the lower layer or layers of material having cells provided with sidewalls, which are of relatively great rigidity and strength compared with the sidewalls of the cellular material, which has been removed. When reference is made to sidewalls of great rigidity, this is to be construed to refer to sidewalls of at least such strength and rigidity and of sufficient thickness to hold the article to the applied surface under the stress induced by changes in temperature. In other words, in certain localities it is nothing unusual for the temperature to vary from thirty to forty degrees in a single day. This gives rise to stresses, which must be resisted by the walls of the cells of the cellular coating. The side walls may, of course, have greater strength and rigidity than above set forth.

Referring to Figure 7, the cells 1 having sidewalls 2 are approximately of the same size. While there is some variation in the size of the cells, considering the entire cell surface the generalization may be made that the cells are the same size and are approximately of the same depth. In general, the maximum diameter of the cells, considering each cell as a sphere, is about 2 mm. but may extend from 1½ to 3 mm. While a 3 mm. cell is twice the diameter of the 1½ mm. cell, yet for the purposes of the present invention these cells can, because of the smallness of the diameters involved, be considered cells of approximately the same diameter or nearly the same diameter. In other words, there is not a wide variation in the diameters of the cells. This uniformity of bubble size cannot, so far as the inventor is aware, be attained by any other method except by the method herein set forth of utilizing a viscous enamel with a gas-evolving agent, and trapping the gas-evolving agent in the viscous enamel, while regulating the time and/or temperature of firing, as hereinafter set forth.

These are relatively large cells, and as the cells increase in size due to control conditions, as hereinafter explained, there is some variation in the size of the different cells, one cell having a larger diameter than the adjacent cell, etc. Considering the depth of the cells measured from the horizontal plane of the sidewalls of the cells to the bottom of the cells, the average figure for this depth is .2 mm. Of course, as hereinbefore pointed out, the depth of the cell and size of the cell can be controlled by regulating for given enamel the temperature and time of firing in connection with the gas-evolving agent. The depth of the cell is also controlled by the amount of the material which is removed from each cell. In other words, in the present case, considering the top row of cells extending across the face of the article, at least the upper half of the cell has been removed.

It is to be noted that the sidewalls too are not of the same height, or stated differently, the tops of the sidewalls are not in the same plane. This produces what may be termed a file-like surface. In other words, the same kind of surface is produced as is produced on a file, that is, a rough surface. This rough, file-like surface promotes the adherence of the cellular surface to the medium to which it is applied, and is a feature of the present invention.

It is to be noted that the cells 1 preferably extend down and just into the upper surface of the ground coat. A twenty gauge steel plate has a thickness of .9 mm. When ground coat is applied on either side of the plate, the thickness of the plate with the two ground coats is 1.15 mm. This gives a thickness of the ground coat at about .125 mm. This is an average thickness. With a rather heavy gauge steel plate, the thickness of the ground coat might be increased, but this would be rather extra-ordinary. The cellular coating, which is attached to the ground coating, after having its top layer removed had a depth of .5 mm. making a total depth of the steel sheet with the ground coat on both sides and the adherent coating 1.65 mm. An adherent coating of .5 mm. illustrates the type of adhering coating which is the subject matter of the present invention. This may be termed a relatively thin layer of cellular porcelain enamel which is provided with non-connected cellular cavities. It is recognized that this layer may be increased and it may vary between .5 mm. or lower and 2 mm. For the purposes of the present invention, an adherent coating of 2 mm. would be a rather thick coating. While it is not desired to be limited to any specific thickness of adherent coating functioning as an adhesive medium, it may be stated in general that the coating should, in general, be between .5 mm. or lower and 2.0 mm. It is recognized, however, that the thickness of the coating may be somewhat greater. The whole point is that all that is necessary is an extremely thin adherent coating, since the function of the coating is to act as an adhesive medium.

As shown in Figure 8, the cells 3 provided with sidewalls 4 are of much smaller diameter, but the depth is about the same. The same enamel mixture No. 3 was used in making the cellular surface and, in general, the cells portrayed in Figure 8 were made under the very same circumstances as that set forth in Figure 7, and all the remarks in Figure 7 made with reference to the production of the sample portrayed in Figure 7, are applicable to the sample portrayed in Figure 8, with the exception that the enamel forming the cells of Figure 8 was fired at a temperature of 1450° Fahrenheit for two and one-half minutes. This illustrates the step of controlling the size of the cells or cup-like depressions, by firing at a higher temperature. In other words, all conditions being the same, the higher the temperature of firing, the larger the diameter of the cells, considering each cell as a sphere. The time of firing, as a usual thing, is increased with the decrease in temperature. This treatment is necessitated in order that the product may be brought to complete vitrification and thus gain its maximum strength and rigidity. The variation of firing time must be carefully controlled, in order to give the proper degree of vitrification, while at the same time avoiding a decreased viscosity and an increase in bubble size. Thus, the sample portrayed in Figure 7 was fired at 1500° Fahrenheit for 2 minutes, and when the temperature was reduced fifty (50) degrees the time of firing was increased ½ minute. However, it is the increase in temperature which is primarily responsible for the increase in the size of the bubbles. In other words, as the temperature goes up the gas that is present in the viscous mix expands to produce a larger bubble. In carrying out the invention, the mix is heated so as to trap the major portion of the gases generated by the gas-evolving agent. The cells 3 portrayed in Figure 8 have a diameter of about 1.5 mm.

Referring to Figure 9, the cells 6 provided with sidewalls 7 produced under conditions identical to those described in connection with samples having cell formation, portrayed in Figures 7 and 8, with the exception that the enamel mix of Formula No. 3, hereinbefore mentioned, was fired at 1350° Fahrenheit for a period of four minutes. Here again a decrease in the temperature of firing resulted in a decrease in the cell size. The cells portrayed in Figure 9 were about .5 mm. or less in diameter. In general, it is pointed out that the finer the cells the greater the keying area of the adhesive surface.

The bubble size set forth in connection with the discussion of Figures 7 to 9 inclusive is illustrative, and the present invention is not limited to the formation of cells having the diameter and depths above set forth. Great variations can be made in these and the resulting surface still comes within the spirit of the present invention. It is desired to point out that the bottoms of the cells are vitrified or semi-vitrified and the sidewalls of the cells are preferably cellular, while simultaneously being rigid and of high strength.

It is not necessary that the cells 1, 3 and 6 be embedded directly in the ground coat. In fact, in most cases said cells are underlain by a layer or layers of cells of greatly reduced diameter, which lie directly on the ground coat, but it is preferred that the cells, portions of which have been cut away and which expose cup-like depressions, be fairly near to the ground coat, as this favors a strong adherence of this layer to the ground coat and therefore of the layer to the metal plate. It must be pointed out, however, that it is possible to remove the surface layers of the cellular material clear down to the layer of cells immediately over the ground coat. While this gives a smaller cell size than that obtained by cutting into a higher layer of cells, it has also been noted that the cells at the bottom layer are more widely distributed, that is, the cell walls are thicker, so that the surface area at this point is not in proportion to the diameter of the cells. It is to be pointed out that the size of the cells in any one cellular layer, while varying from those in other cellular layers, will be substantially uniform and thus it may be possible to obtain various cell sizes for any one composition and burning treatment, depending upon the depth of the cellular material removed from the surface. In general, however, this method is not to be recommended. For the preferred form, the cellular surface material is removed to a depth sufficient to leave only two or three layers of cells remaining above the ground coat.

While it has been stated that the surface produced in accordance with the present invention may be used to key a metal plate, preferably a steel metal plate, to plaster, concrete or cement, it is obvious that the cell-like porcelain enamel surfaces of the present invention may be keyed onto a mastic surface, asphalt surface or in fact to any kind of an intermediate surface that is plastic enough to receive a roughened porcelain surface.

The plates carrying the roughened porcelain surface may be of any size. The present invention may be used to apply a cellular backing of the type herein specified on tile, shingles, spandrels, strips, panels and in general for the usual building elements.

The present application is a continuation-in-part of application, Serial No. 56,565, said prior application having matured into Patent No. 2,053,244.

I claim:

1. A composite article adapted to adhere to an applied surface, comprising a metal base provided with a fired ground coat and having permanently united therewith a relatively thin layer of the completely vitrified cellular fushion product of porcelain enamel material in the presence of a gas-evolving agent, the top portion of said cellular layer being removed to provide a layer of non-connected cellular cavities affording large gripping surface, the thickness of said final cellular layer varying between .5 mm. or lower and 2.0 mm., said cellular cavities having sidewalls of relatively great rigidity capable of withstanding when in contact with the applied surface wide temperature variations.

2. A composite article adapted to adhere to an applied surface, comprising a metal base provided with a fired ground coat and having permanently united therewith a relatively thin layer of the completely vitrified cellular fusion product of porcelain enamel material in the presence of a cobalt oxide gas-evolving agent, the top portion of said cellular layer being removed to provide a layer of non-connected cellular cavities affording large gripping surface, the thickness of said final cellular layer varying between .5 mm. or lower and 2.0 mm., said cellular cavities having sidewalls of relatively great rigidity capable of withstanding when in contact with the applied surface wide temperature variations.

3. A composite article adapted to adhere to an applied surface, comprising a metal base provided with a fired ground coat and having permanently united therewith a relatively thin layer of the completely vitrified cellular fusion product of porcelain enamel material in the presence of a gas-evolving agent, the top portion of said cellular layer being removed to provide a layer of non-connected cellular cavities affording large gripping surface, the thickness of said final cellular layer varying between .5 mm. or lower and 2.0 mm., said cellular cavities having sidewalls of relatively great rigidity capable of withstanding when in contact with the applied surface wide temperature variations, the top surfaces of said sidewalls lying in slightly different planes, providing a file-like surface.

4. A composite article adapted to adhere to an applied surface, comprising a metal base provided with a fired ground coat and having permanently united therewith a relatively thin layer of the completely vitrified cellular fusion product of porcelain enamel material in the presence of a cobalt oxide gas-evolving agent, the top portion of said cellular layer being removed to provide a layer of non-connected cellular cavities affording large gripping surface, the thickness of said final cellular layer varying between .5 mm. or lower and 2.0 mm., said cellular cavities having sidewalls of relatively great rigidity capable of withstanding when in contact with the applied surface wide temperature variations, the top surfaces of said sidewalls lying in slightly different planes, providing a file-like surface.

5. A composite article adapted to adhere to an applied surface, comprising a metal base provided with a fired ground coat and having permanently united therewith a relatively thin layer of the completely vitrified fusion product of porcelain enamel material in the presence of a cobalt oxide gas-evolving agent, the specific gravity of said cellular fusion product ranging from one-half to one-eighth specific gravity of the original porcelain enamel material, the top portion of said cellular layer being removed to provide a layer of non-connected cellular cavities affording a large gripping surface, the thickness of said cellular layer varying between .5 mm. or lower and 2 mm., said cellular cavities having sidewalls of relatively great rigidity capable of withstanding when in contact with the applied surface wide temperature variations, the top surfaces of said sidewalls lying in slightly different planes, providing a file-like surface.

6. A composite article adapted to adhere to an applied surface, comprising a metal base provided with a fired ground coat and having permanently united therewith a relatively thin layer of the completely vitrified fusion product porcelain enamel material in the presence of a gas-evolving agent, the specific gravity of said cellular fusion product ranging from one-half to one-eighth specific gravity of the original porcelain enamel material, the top portion of said cellular layer being removed to provide a layer of non-connected cellular cavities affording a large gripping surface, the thickness of said cellular layer varying between .5 mm. or lower and 2 mm., said cellular cavities having sidewalls of relatively great rigidity capable of withstanding when in contact with the applied surface wide temperature variations, the top surfaces of said sidewalls lying in slightly different planes, providing a file-like surface.

7. A faced metal building tile adapted to adhere to an applied surface comprising a metal base having an ornamental enamel coating permanently united to one face thereof, and an adherent enamel coating permanently united to the other face thereof, said adherent enamel coating comprising a relatively thin layer of the completely vitrified cellular fusion product of porcelain enamel material in the presence of a gas evolving agent, said fusion product being provided with non-connected cellular cavities affording a large gripping surface, the thickness of said layer varying between .5 mm. or lower and 2 mm., said cellular cavities having side walls of relatively great rigidity capable of withstanding when in contact with said applied surface wide temperature variations, said cellular adherent coating comprising a large number of small cells for receiving a suitable medium for joining the faced building tile to a structural unit.

8. A faced metal building tile adapted to adhere to an applied surface comprising a metal base provided with a fired ground coat and having permanently united thereto a relatively thin layer of the completely vitrified fusion product of porcelain enamel in the presence of a gas evolving agent, said fusion product being provided for non-connected cellular cavities affording a large gripping surface, the thickness of said layer varying between .5 mm. or lower and 2 mm., said cellular cavities having side walls of relatively great rigidity capable of withstanding when in contact with the applied surface wide temperature variations.

KARL TURK.